(No Model.)
C. F. HERMAN.
CUT-OFF FOR WATERING TROUGHS.
No. 473,749. Patented Apr. 26, 1892.
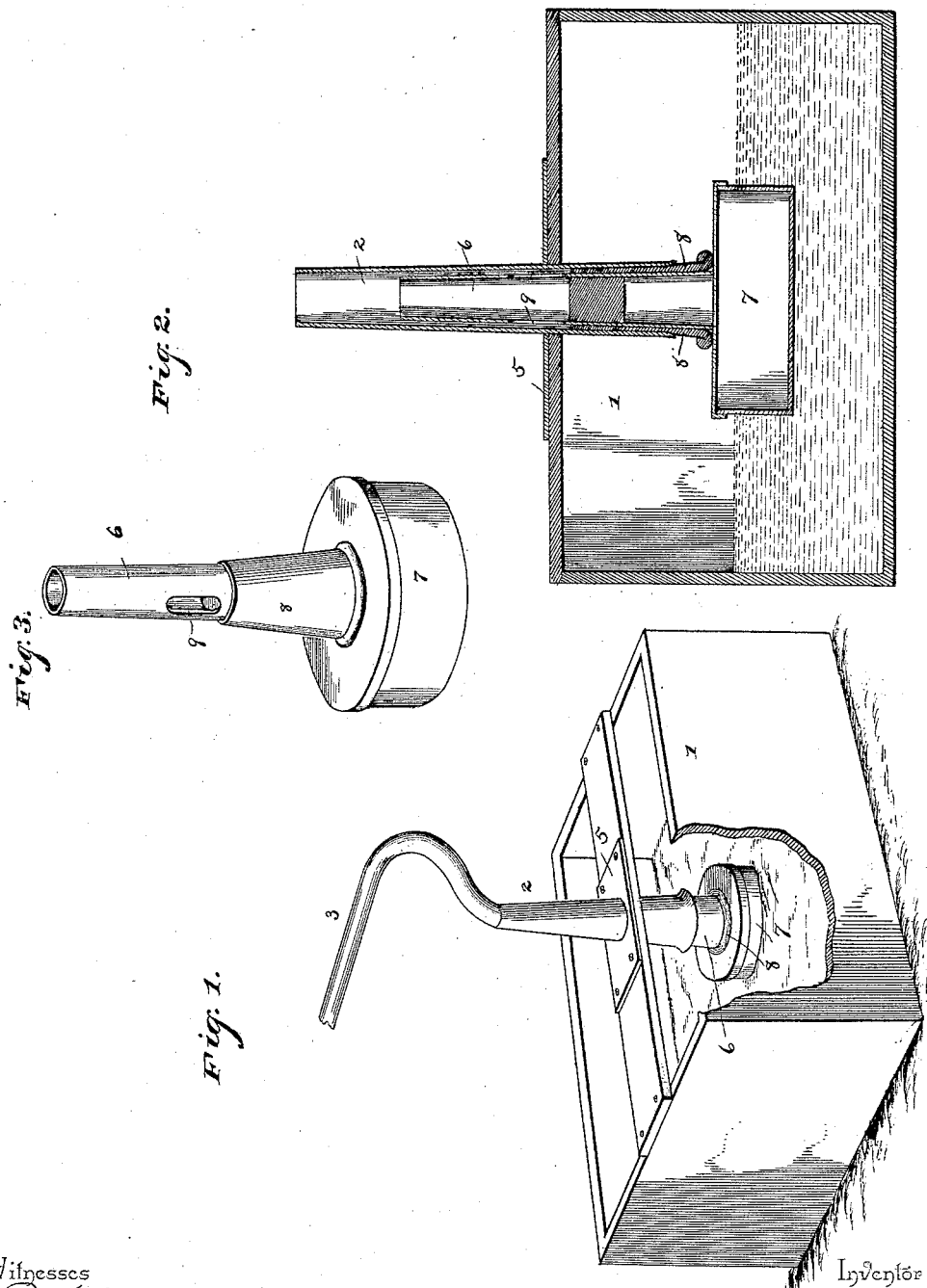
Witnesses
Inventor
Charles F. Herman,
By his Attorneys,

UNITED STATES PATENT OFFICE.

CHARLES F. HERMAN, OF TOBIAS, NEBRASKA.

CUT-OFF FOR WATERING-TROUGHS.

SPECIFICATION forming part of Letters Patent No. 473,749, dated April 26, 1892.

Application filed September 16, 1891. Serial No. 405,931. (No model.)

*To all whom it may concern:*

Be it known that I, CHARLES F. HERMAN, a citizen of the United States, residing at Tobias, in the county of Saline and State of Nebraska, have invented a new and useful Cut-Off for Watering-Troughs, of which the following is a specification.

The invention relates to improvements in automatic cut-offs for watering-troughs.

The object of the present invention is to provide for watering-troughs an automatic cut-off which will regulate the supply of water and discharge the same into the trough as it is needed by the stock.

The invention consists in the construction and novel combination and arrangement of parts hereinafter fully described, illustrated in the accompanying drawings, and pointed out in the claim hereto appended.

In the drawings, Figure 1 is a perspective view of an automatic cut-off constructed in accordance with this invention. Fig. 2 is a vertical sectional view. Fig. 3 is a detail perspective view of the float.

Like numerals of reference designate corresponding parts in all the figures of the drawings.

1 designates a watering-trough, upon which is mounted a discharge-tube 2, which has its upper end connected to a hose 3, leading from a barrel or tank or other source of water-supply, and is adapted to supply water from the barrel or tank to the trough 1 as it is needed by the stock. The discharge-tube 2 is provided intermediate its ends with a plate 5, whereby it is secured to the trough. The lower end of the discharge-tube is slightly flared and has arranged within it a float-tube 6 of a float 7, which is adapted to rise with the water in the trough and to close the lower end of the discharge-tube 2 when the water in the trough is at the desired height, and, as shown, as the water is used by the stock the float falls and the water of the trough is replenished. The float is cylindrical, and the tube 6, which is secured thereto at its lower end, has its lower end enlarged and of a slightly-conical form, and is provided with a covering 8, of rubber or similar material, adjusted to close the lower end of the discharge-tube. The tube 6 has its upper end always arranged within the discharge-tube and is guided by the same and is provided intermediate its ends with discharge-openings 9, arranged on opposite sides of the tube, which is closed at the bottom of the openings, and water discharged from the tube 2 falling into the tube 6 of the float passes out through the openings.

It will be seen that the float is guided by the discharge-tube and that a simple and automatic cut-off is provided which will regulate the discharge of water and will afford a continual supply for stock.

What I claim is—

In an automatic cut-off, the combination of a discharge-tube provided with a conical lower portion, a float, a float-tube secured at its lower end to the float and having its lower portion flared or conical and its upper portion arranged within the discharge-tube and guided by the same and provided intermediate its ends with discharge-openings and being closed at the lower ends of the opening, the upper portion of the float-tube forming a water-pipe, and a flexible conical covering extending over the lower portion of the float-tube and adapted to enter and close the discharge-tube, substantially as described.

In testimony that I claim the foregoing as my own I have hereto affixed my signature in presence of two witnesses.

CHARLES F. HERMAN.

Witnesses:
M. JAGGAR,
J. V. AINSWORTH.